United States Patent
Remaklus, Jr. et al.

(10) Patent No.: US 12,481,340 B2
(45) Date of Patent: Nov. 25, 2025

(54) PROVIDING MEDIA POWER TELEMETRY FOR VIRTUAL MACHINES (VMs) IN PROCESSOR-BASED DEVICES

(71) Applicant: Microsoft Technology Licensing, LLC, Redmond, WA (US)

(72) Inventors: Perry Willmann Remaklus, Jr., Raleigh, NC (US); Richard Gerard Hofmann, Cary, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 13 days.

(21) Appl. No.: 18/437,871

(22) Filed: Feb. 9, 2024

(65) Prior Publication Data

US 2025/0258530 A1    Aug. 14, 2025

(51) Int. Cl.
*G06F 1/00* (2006.01)
*G06F 1/28* (2006.01)
*G06F 9/455* (2018.01)
*G06F 1/30* (2006.01)

(52) U.S. Cl.
CPC ............ *G06F 1/28* (2013.01); *G06F 9/45558* (2013.01); *G06F 1/30* (2013.01); *G06F 2009/45591* (2013.01)

(58) Field of Classification Search
CPC .................. G06F 1/28; G06F 9/45558; G06F 2009/45591
USPC ........................................................ 713/340
See application file for complete search history.

(56) References Cited

U.S. PATENT DOCUMENTS

| 9,201,485 | B2 * | 12/2015 | DeHaan | G06F 1/3234 |
| 11,782,494 | B2 * | 10/2023 | Khodorkovsky | G06F 9/5077 718/1 |
| 2014/0149752 | A1 * | 5/2014 | Brock | G06F 11/3017 713/300 |
| 2016/0231798 | A1 * | 8/2016 | Gendler | G06F 1/3206 |

(Continued)

OTHER PUBLICATIONS

International Search Report and Written Opinion received for PCT Application No. PCT/US2025/010148 (MS# 413868-PCT01), mailed on May 7, 2025, 15 pages.

*Primary Examiner* — Volvick Derose
(74) *Attorney, Agent, or Firm* — Scott Y. Shigeta; Newport IP, LLC

(57) ABSTRACT

Providing media power telemetry for virtual machines (VMs) in processor-based devices is disclosed herein. In one exemplary embodiment, a processor-based device provides a controller circuit comprising a power telemetry circuit, and a power management processor. The power telemetry circuit is configured to determine whether a media access request corresponding to a power telemetry event and directed to a media device is detected, and determine whether the media access request matches an event selection filter specified by an event selection control and status register (CSR) corresponding to the power telemetry event. If so, the power telemetry circuit increments a power telemetry counter corresponding to the power telemetry event by a relative power value associated with a media access request type of the media access request. The power management processor determines a power management operation based on the power telemetry counter corresponding to the power telemetry event, and applies the power management operation.

20 Claims, 8 Drawing Sheets

(56) References Cited

U.S. PATENT DOCUMENTS

| | | | |
|---|---|---|---|
| 2017/0185139 A1* | 6/2017 | Zwerg | G06F 1/3206 |
| 2018/0203609 A1 | 7/2018 | Krueger | |
| 2018/0262407 A1* | 9/2018 | Biswas | H04L 43/12 |
| 2019/0033939 A1* | 1/2019 | Arora | G06F 13/1673 |
| 2019/0094926 A1* | 3/2019 | Subramanian | G06F 1/324 |
| 2022/0295160 A1* | 9/2022 | Wang | G06F 21/72 |
| 2022/0357784 A1* | 11/2022 | Rajwan | G06F 11/3495 |
| 2024/0427396 A1* | 12/2024 | Koorapati | G06F 1/3234 |

* cited by examiner

PROVIDING MEDIA POWER TELEMETRY FOR VIRTUAL MACHINES (VMs) IN PROCESSOR-BASED DEVICES

FIELD OF THE DISCLOSURE

The technology of the disclosure relates to the use of virtual machines (VMs) in processor-based devices, and, more particularly, to optimizing power and thermal management for processor-based devices executing VMs.

BACKGROUND

Virtualization is a technique by which conventional processor-based devices can create and execute software-based computer system emulations known as "virtual machines" or "VMs." A VM comprises a computer image file that, when executed by one or more host processor-based devices, behaves like a physical computer system. Execution of VMs is controlled and managed by a "hypervisor" or "virtual machine manager (VMM)" that runs on the host processor-based device(s). The hypervisor allocates processor resources, memory, and storage space of the host processor-based device(s) to each executing VM, and ensures that each VM is isolated from the resources allocated to other executing VMs and to the hypervisor itself. This isolation gives VMs the advantage of complete independence from one another and from the host processor-based device(s), which enables increased flexibility and portability relative to physical computer systems.

A VM is generally capable of executing any workload that may be executed by a corresponding physical computer system. Such workloads may vary in terms of their short- and long-term use of underlying physical resources such as processor capacity, memory space and bandwidth, and persistent storage space and bandwidth. Consequently, the workloads executed by VMs may affect power and/or thermal levels for the underlying host processor-based device(s). To avoid exceeding power and thermal limits to which a host processor-based device is subject, power management processors and/or software on the host processor-based device may perform power management operations such as clock throttling when necessary. However, such power management operations may have negative impacts on workload performance.

One approach to minimizing the potential need for power management operations involves taking the media power consumption of a VM into account when assigning the VM to a particular physical computing resource (e.g., a specific System-on-Chip (SoC), platform, or rack, as non-limiting examples). In this manner, multiple VMs may be more efficiently distributed among the physical computing resources, such that each host processor-based device is more likely to remain within its power and thermal limit envelopes. Conventional implementations of this approach track discrete counts for different operations performed by a controller circuit, such as encrypted memory reads, encrypted memory writes, unencrypted memory reads, and unencrypted memory writes. These discrete counts are then read at specific intervals and mathematically combined to generate a value representing power consumed during the interval. This approach, though, does not account for the fact that the amount of power consumed by each operation may vary based on the controller circuit's workload. Moreover, this approach is less efficient in terms of processor area, as measuring media power consumption for multiple VMs requires a separate set of multiple counters for each VM.

SUMMARY

Exemplary embodiments disclosed herein provide media power telemetry for virtual machines (VM) in processor-based devices. In this regard, in one exemplary embodiment, a processor-based device provides a controller circuit that includes a power telemetry circuit that is configured to collect power telemetry by indirectly measuring media power consumption of VMs. The processor-based device further provides a power management processor that is configured to use the power telemetry in determining and performing power management operations. In exemplary operation, the power telemetry circuit determines whether a media access request that corresponds to a power telemetry event, and that is directed to a media device (e.g., a memory device) of the processor-based device, is detected. The power telemetry event may comprise, for example, an event indicating that the media access request is received from a particular VM, or from a particular group of VMs. In response to detecting the media access request, the power telemetry circuit determines whether the media access request matches an event selection filter specified by an event selection control and status register (CSR) that corresponds to the power telemetry event. In some embodiments, determining whether the media access request matches the event selection filter may comprise determining whether a result of an AND operation of a request mask value specified by the event selection CSR and an identifier of the media access request matches a corresponding request match value specified by the event selection CSR. Some embodiments may provide that determining whether the media access request matches the event selection filter comprises determining whether the result of the AND operation of the request mask value specified by the event selection CSR and the identifier of the media access request does not match the corresponding request match value specified by the event selection CSR.

In response to determining that the media access request matches the event selection filter, the power telemetry circuit increments a power telemetry counter corresponding to the power telemetry event by a relative power value associated with a media access request type of the media access request. The relative power value used to increment the power telemetry counter represents power consumed by one or more of, e.g., a controller circuit, a physical interface, and a media device, as non-limiting examples, for the media access request type. Subsequently, the power management processor of the processor-based device determines a power management operation based on the power telemetry counter corresponding to the power telemetry event. The power management processor then applies the power management operation. In this manner, media power consumption by multiple VMs and/or groups of VMs may be efficiently and simultaneously tracked using a single aggregate power telemetry counter for each VM or group of VMs based on multiple underlying operations.

The relative power value in some embodiments is determined by the power telemetry circuit using a relative power CSR comprising a plurality of relative power fields. Each of the relative power fields of the relative power CSR is associated with a different media access request type, and stores a relative power value for that media access request type. In such embodiments, the power telemetry circuit, as part of incrementing the power telemetry counter, identifies a relative power field corresponding to the media access request type among the plurality of relative power fields of the relative power CSR, and retrieves the relative power value from the relative power field.

Some embodiments further provide that the relative power CSR is one of a plurality of relative power CSRs that are each associated with a different media utilization state representing a workload level of the controller circuit. Such embodiments may provide that the power telemetry circuit selects the relative power CSR from among the plurality of relative power CSRs based on a current media utilization state of the controller circuit. In some such embodiments, the relative power CSR may be selected by comparing the current media utilization state of the controller circuit to one or more utilization threshold values that are stored in utilization threshold fields of a media utilization threshold CSR.

According to some embodiments, the current media utilization state of the controller circuit may be tracked using a media access vector comprising a plurality of bits. Upon detecting the media access request, the power telemetry circuit may increment a bit of the plurality of bits that corresponds to a current time interval (e.g., a most recent execution cycle of the controller circuit, as a non-limiting example). If no media access request is detected during the current time interval, the power telemetry circuit may clear the bit of the plurality of bits that corresponds to the current time interval. The current media utilization state of the controller circuit may be subsequently determined by counting the number of set bits among the plurality of bits of the media access vector. In some embodiments, the number of set bits may be tracked using a media access counter that is updated based on a previous value of the bit of the plurality of bits that corresponds to the current time interval. For example, the media access counter may be incremented if the value of the bit is updated from a previous value of zero (0) to a value of one (1), or may be decremented if the value of the bit is changed from a previous value of one (1) to a value of zero (0). The number of set bits may then be determined based on a value of the media access counter. The power telemetry circuit may then determine the current media utilization state based on a value of the media access counter.

In another exemplary embodiment, a processor-based device comprises a controller circuit comprising a power telemetry circuit and a power management processor. The power telemetry circuit is configured to determine whether a media access request corresponding to a power telemetry event and directed to a media device is detected. The power telemetry circuit is further configured to, responsive to determining that the media access request corresponding to the power telemetry event and directed to the media device is detected, determine whether the media access request matches an event selection filter specified by an event selection CSR corresponding to the power telemetry event. The power telemetry circuit is also configured to, responsive to determining that the media access request matches the event selection filter, increment a power telemetry counter corresponding to the power telemetry event by a relative power value associated with a media access request type of the media access request. The power management processor is configured to determine a power management operation based on the power telemetry counter corresponding to the power telemetry event. The power management processor is further configured to apply the power management operation.

In another exemplary embodiment, a method for providing media power telemetry for VMs in processor-based devices is provided. The method comprises determining, by a power telemetry circuit of a controller circuit of a processor-based device, that a media access request corresponding to a power telemetry event and directed to a media device of the processor-based device is detected. The method further comprises, responsive to determining that the media access request corresponding to the power telemetry event and directed to the media device of the processor-based device is detected, determining, by the power telemetry circuit, that the media access request matches an event selection filter specified by an event selection CSR corresponding to the power telemetry event. The method also comprises, responsive to determining that the media access request matches the event selection filter, incrementing, by the power telemetry circuit, a power telemetry counter corresponding to the power telemetry event by a relative power value associated with a media access request type of the media access request. The method additionally comprises determining, by a power management processor of the processor-based device, a power management operation based on the power telemetry counter corresponding to the power telemetry event. The method further comprises applying, by the power management processor, the power management operation.

In another exemplary embodiment, a non-transitory computer-readable medium is provided, the computer-readable medium having stored thereon computer-executable instructions which, when executed by a processor device of a processor-based device, cause the processor device to determine whether a media access request corresponding to a power telemetry event and directed to a media device of the processor-based device is detected. The computer-executable instructions further cause the processor device to, responsive to determining that the media access request corresponding to the power telemetry event and directed to the media device is detected, determine whether the media access request matches an event selection filter specified by an event selection CSR corresponding to the power telemetry event. The computer-executable instructions also cause the processor device to, responsive to determining that the media access request matches the event selection filter, increment a power telemetry counter corresponding to the power telemetry event by a relative power value associated with a media access request type of the media access request. The computer-executable instructions additionally cause the processor device to determine a power management operation based on the power telemetry counter corresponding to the power telemetry event. The computer-executable instructions further cause the processor device to apply the power management operation.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

DETAILED DESCRIPTION

Figure 1:
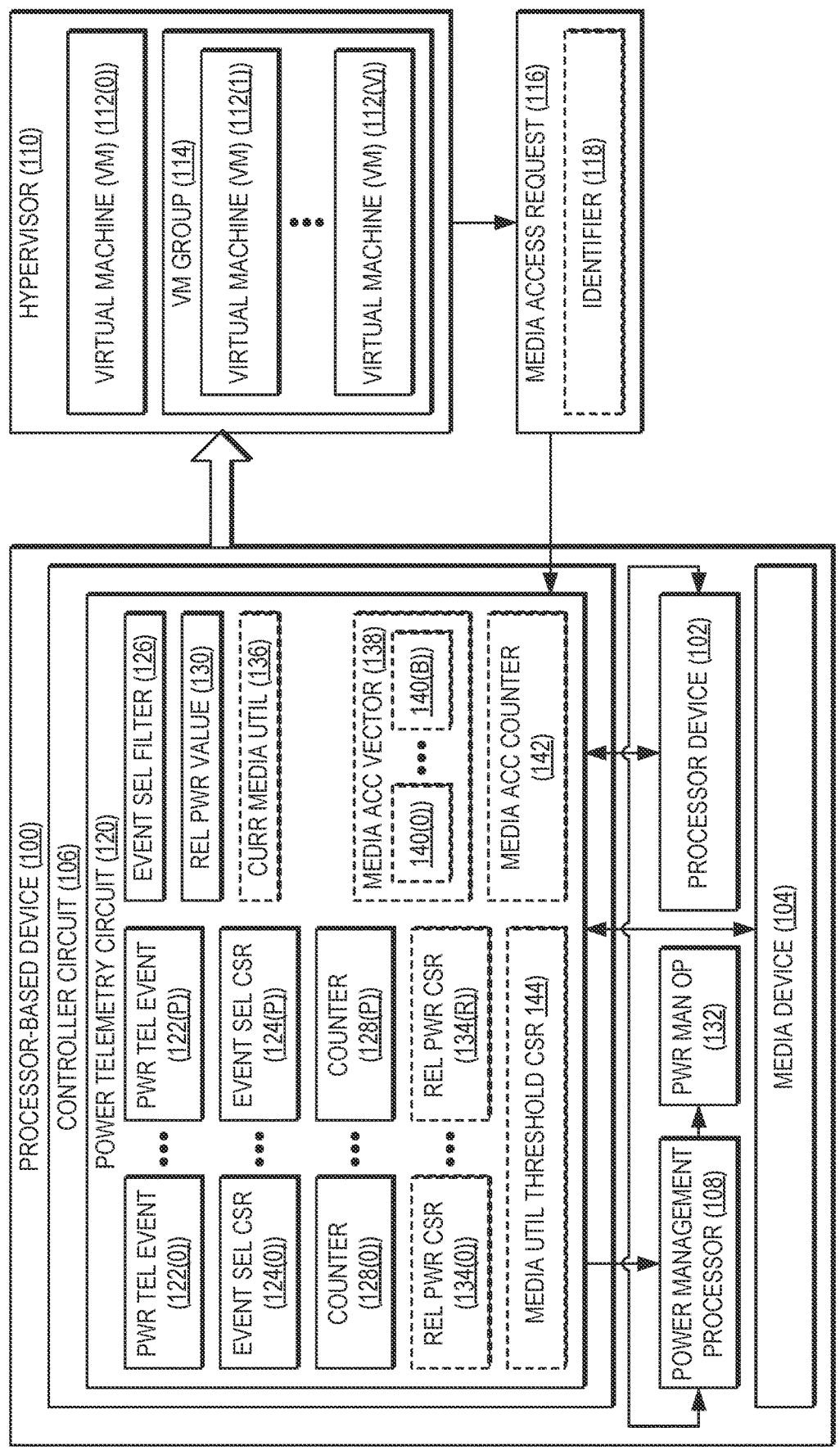
FIG. 1 is a schematic diagram of an exemplary processor-based device that includes a power telemetry circuit configured to provide media power telemetry for virtual machines (VMs)

Exemplary embodiments disclosed herein provide media power telemetry for virtual machines (VM) in processor-based devices. In this regard, in one exemplary embodiment, a processor-based device provides a controller circuit that includes a power telemetry circuit that is configured to collect power telemetry by indirectly measuring media power consumption of VMs. The processor-based device further provides a power management processor that is configured to use the power telemetry in determining and performing power management operations. In exemplary operation, the power telemetry circuit determines whether a media access request that corresponds to a power telemetry event, and that is directed to a media device (e.g., a memory device) of the processor-based device, is detected. The power telemetry event may comprise, for example, an event indicating that the media access request is received from a particular VM, or from a particular group of VMs. In response to detecting the media access request, the power telemetry circuit determines whether the media access request matches an event selection filter specified by an event selection control and status register (CSR) that corresponds to the power telemetry event. In some embodiments, determining whether the media access request matches the event selection filter may comprise determining whether a result of an AND operation of a request mask value specified by the event selection CSR and an identifier of the media access request matches a corresponding request match value specified by the event selection CSR. Some embodiments may provide that determining whether the media access request matches the event selection filter comprises determining whether the result of the AND operation of the request mask value specified by the event selection CSR and the identifier of the media access request does not match the corresponding request match value specified by the event selection CSR.

In response to determining that the media access request matches the event selection filter, the power telemetry circuit increments a power telemetry counter corresponding to the power telemetry event by a relative power value associated with a media access request type of the media access request. The relative power value used to increment the power telemetry counter represents power consumed by, e.g., a controller circuit, a physical interface, or a media device, as non-limiting examples, for the media access request type. Subsequently, the power management processor of the processor-based device determines a power management operation based on the power telemetry counter corresponding to the power telemetry event. The power management processor then applies the power management operation. In this manner, media power consumption by multiple VMs and/or groups of VMs may be efficiently and simultaneously tracked using a single aggregate power telemetry counter for each VM or group of VMs based on multiple underlying operations.

The relative power value in some embodiments is determined by the power telemetry circuit using a relative power CSR comprising a plurality of relative power fields. Each of the relative power fields of the relative power CSR is associated with a different media access request type, and stores a relative power value for that media access request type. In such embodiments, the power telemetry circuit, as part of incrementing the power telemetry counter, identifies a relative power field corresponding to the media access request type among the plurality of relative power fields of the relative power CSR, and retrieves the relative power value from the relative power field.

Some embodiments further provide that the relative power CSR is one of a plurality of relative power CSRs that are each associated with a different media utilization state representing a workload level of the controller circuit. Such embodiments may provide that the power telemetry circuit selects the relative power CSR from among the plurality of relative power CSRs based on a current media utilization state of the controller circuit. In some such embodiments, the relative power CSR may be selected by comparing the current media utilization state of the controller circuit to one or more utilization threshold values that are stored in utilization threshold fields of a media utilization threshold CSR.

According to some embodiments, the current media utilization state of the controller circuit may be tracked using a media access vector comprising a plurality of bits. Upon detecting the media access request, the power telemetry circuit may increment a bit of the plurality of bits that corresponds to a current time interval (e.g., a most recent execution cycle of the controller circuit, as a non-limiting example). If no media access request is detected during the current time interval, the power telemetry circuit may clear the bit of the plurality of bits that corresponds to the current time interval. The current media utilization state of the controller circuit may be subsequently determined by counting the number of set bits among the plurality of bits of the media access vector. In some embodiments, the number of set bits may be tracked using a media access counter that is updated based on a previous value of the bit of the plurality of bits that corresponds to the current time interval. For example, the media access counter may be incremented if the value of the bit is updated from a previous value of zero (0) to a value of one (1), or may be decremented if the value of the bit is changed from a previous value of one (1) to a value of zero (0). The number of set bits may then be determined based on a value of the media access counter. The power telemetry circuit may then determine the current media utilization state based on a value of the media access counter.

In this regard, FIG. 1 illustrates an exemplary processor-based device 100 that includes a processor device 102. The processor device 102 may comprise one or more processor cores (not shown), each of which may include an instruction processing circuit (not shown) comprising an execution pipeline (not shown) for executing computer instructions. It is to be understood that some embodiments of the processor-based device 100 may comprise multiple processor devices 102 rather than the single processor device 102 shown in the example of FIG. 1, and further that the processor-based device 100 may be one of multiple processor-based devices 100, e.g., organized as a cluster. In some embodiments, the processor-based device 100 may comprise a System-on-Chip (SoC), as a non-limiting example.

As seen in FIG. 1, the processor device 102 is communicatively coupled to a media device 104 via a controller circuit 106. The media device 104 in some embodiments may comprise a memory device such as a Double Data Rate Synchronous Dynamic Random-Access Memory (DDR SDRAM). While the media device 104 is shown in FIG. 1 as an integral element of the processor-based device 100, some embodiments may provide that the media device 104 comprises an external memory device, as a non-limiting example. The controller circuit 106 may comprise a memory controller circuit configured to manage access to data stored by the media device 104.

The processor device 102 of FIG. 1 is also communicatively coupled to a power management processor 108 of the processor-based device 100. The power management processor 108 is configured to perform power management operations to control all power consumption and thermal levels of the processor-based device 100.

The power management operations performed by the power management processor 108 may comprise, e.g., performing clock throttling on the processor device 102. In some embodiments, the power management processor 108 may comprise any combination of circuitry, processor-based software, artificial intelligence (AI) models, and the like, as non-limiting examples, for implementing and executing algorithms for performing the power management operations.

In the example of FIG. 1, the processor device 102 is executing a hypervisor 110 for providing virtualization functionality. Executing within the hypervisor 110 are VMs 112(0)-112(V), each of which comprises a computer image file (not shown) that, when executed by the processor device 102, behaves like a physical computer system. The hypervisor 110 is configured to allocate physical resources of the processor-based device 100, such as processor resources of the processor device 102 and/or storage resources of the media device 104, to the VMs 112(0)-112(V), and to ensure that each of the VMs 112(0)-112(V) is isolated from the physical resources allocated to other VMs and to the hypervisor 110 itself. The hypervisor 110 in the example of FIG. 1 supports the organization of VMs such as the VMs 112(1)-112(V) into a VM group 114. The VMs 112(0)-112 (V) and the VM group 114 may each be associated with identifiers such as a Memory Partitioning and Performance Monitoring (MPAM) performance monitoring group identifier, an MPAM partition identifier, and/or an MPAM namespace selector identifier.

The VMs 112(0)-112(V) may seek access to the media device 104 of the processor-based device 100 by transmitting a media access request such as the media access request 116. The media access request 116 corresponds to a media access request type, such as an encrypted read request, an encrypted write request, an unencrypted read request, or an unencrypted write request, as non-limiting examples. The media access request 116 also includes an identifier 118 associating the media access request 116 with a specific VM or with a group of VMs. Accordingly, for example, the identifier 118 of the media access request 116 may specify an MPAM performance monitoring group identifier, an MPAM partition identifier, and/or an MPAM namespace selector identifier of the originating VM or VM group.

The processor-based device 100 of FIG. 1 and the constituent elements thereof may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include elements in addition to those illustrated in FIG. 1. For example, the processor device 102 may further include one or more instruction caches, unified caches, controller circuits, interconnect buses, and/or additional memory devices, caches, and/or controller circuits.

As noted above, the power management operations performed by the power management processor 108 of the processor-based device 100 may be used to prevent power and thermal limits of the processor-based device 100 from being exceeded. However, such power management operations may have negative impacts on the performance of workloads executed by the VMs 112(0)-112(V). One approach to mitigating these negative impacts involves assigning each of the VMs 112(0)-112(V) to a particular physical computing resource (e.g., a specific performance processor on a SoC, platform, or rack, as non-limiting examples) based on the respective power consumption and relative performance priority of the VMs 112(0)-112(V). This approach allows the VMs 112(0)-112(V) to be more efficiently distributed among the physical computing resources such that the physical computing resources are more likely to remain within their power and thermal limit envelopes. This approach, though, may require separate sets of multiple counters for each of the VMs 112(0)-112(V), and may not take into account varying amounts of power consumed by media access requests depending on the media access request type of the media access requests and the current media utilization of the controller circuit 106.

In this regard, the controller circuit 106 includes a power telemetry circuit 120 that is configured to provide power telemetry for the VMs 112(0)-112(V). The media power telemetry can be used by the power management processor 108 to more intelligently determine appropriate power management operations to manage the power and thermal states of the processor-based device 100 by combining per-VM processor power and media power to obtain a more accurate VM power estimate. The power telemetry circuit 120 is configured to monitor a plurality of power telemetry events (captioned as "PWR TEL EVENT" in FIG. 1) 122(0)-122(P) that each correspond to an individual VM (such as the VM 112(0)) or to a group of VMs (such as the VM group 114). The power telemetry events 122(0)-122(P) each may comprise, for example, an event indicating that a media access request such as the media access request 116 is received from an individual VM such as the VM 112(0), or an event indicating that the media access request 116 is received a VM group such as the VM group 114.

For each of the power telemetry events 122(0)-122(P), the power telemetry circuit 120 maintains a corresponding event selection CSR (captioned as "EVENT SEL CSR" in FIG. 1) 124(0)-124(P) that defines an event selection filter (captioned as "EVENT SEL FILTER" in FIG. 1) 126 against which media access requests that correspond to the power telemetry event 122(0)-122(P) are compared. The power telemetry circuit 120 further maintains a plurality of power telemetry counters (captioned as "COUNTER" in FIG. 1) 128(0)-128(P) that correspond to the power telemetry events 122(0)-122(P), and that are used to aggregate a relative power value indicating power consumed by media access requests that correspond to the power telemetry events 122(0)-122(P). The power telemetry counters 128(0)-128(P) may comprise, e.g., Performance Monitor Unit (PMU) counters. It is to be understood that, while the event selection CSRs 124(0)-124(P) and the power telemetry counters 128 (0)-128(P) are shown in FIG. 1 as integral elements of the power telemetry circuit 120, some embodiments may provide that the event selection CSRs 124(0)-124(P) and the power telemetry counters 128(0)-128(P) are located external to the power telemetry circuit 120.

In exemplary operation, the power telemetry circuit 120 determines whether a media access request, such as the media access request 116, corresponding to one of the power telemetry events 122(0)-122(P) (e.g., the power telemetry event 122(0), as a non-limiting example) and directed to the media device 104 of the processor-based device 100 is detected. If so, the power telemetry circuit 120 determines whether the media access request 116 matches the event selection filter 126 that corresponds to the power telemetry event 122(0). The event selection filter 126 is defined by fields (not shown) of an event selection CSR that corresponds to the power telemetry event 122(0) (e.g., the event selection CSR 124(0)). For example, the event selection CSR 124(0) in some embodiments may specify one or more request match values (not shown) and one or more corresponding request mask values (not shown). Determining whether the media access request 116 matches the event selection filter 126 may comprise the power telemetry circuit 120 determining whether a result of an AND operation of a request mask value specified by the event selection CSR 124(0) and the identifier 118 of the media access request 116 matches a corresponding request match value specified by the event selection CSR 124(0), or determining whether the result of the AND operation does not match the corresponding request match value. Exemplary fields of event selection CSRs such as the event selection CSR 124(0) are discussed below in greater detail with respect to FIG. 2.

In response to determining that the media access request 116 matches the event selection filter 126 specified by the event selection CSR 124(0) the power telemetry circuit 120 increments the power telemetry counter 128(0) corresponding to the power telemetry event 122(0) by a relative power value (captioned as "REL PWR VALUE" in FIG. 1) 130 that is associated with the media access request type of the media access request 116. The relative power value 130 represents an amount of power consumed by the controller circuit 106 (and, in some embodiments, a physical interface and/or the media device 104) when carrying out a media access request of the associated media access request type. The relative power value 130 is "relative" in the sense that it does not necessarily indicate an actual amount of power consumed, but rather the actual amount of power scaled to the range of the relative power value 130. For instance, if the relative power value 130 is a value represented by eight (8) bits, an actual maximum power consumption amount for the controller circuit 106 may be represented by a relative power value of 255, while a minimum power consumption amount for the controller circuit 106 may be represented by a relative power value of zero (0).

As discussed in greater detail below, the relative power value 130 in some embodiments may vary depending on the media access request type of the media access request 116 (e.g., whether the media access request is an encrypted read access, an encrypted write access, an unencrypted read access, or an unencrypted write access, as non-limiting examples). Some embodiments may also provide that the relative power value 130 for a given media access request type further varies depending on a current media utilization state of the controller circuit 106. For example, the relative power value 130 may be higher when the controller circuit 106 is in a lower media utilization state (i.e., is experiencing a lower workload condition), and conversely may be lower when the controller circuit 106 is in a higher media utilization state (i.e., is experiencing a higher workload condition).

The value of the power telemetry counter 128(0) represents a measure of total power consumption incurred by, e.g., the controller circuit 106, the media device 104, and/or a physical interface between the two. This value may be subsequently used by the power management processor 108 to determine and apply a power management operation (captioned as "PWR MAN OP" in FIG. 1) 132. For example, the power management processor 108 may determine, based on the value of the power telemetry circuit 120 that the VM 112(0) corresponding to the power telemetry event 122(0) should be assigned to a different processor core, a different processor device 102 (in embodiments in which multiple processor devices 102 are present), or a different processor-based device 100 (in embodiments in which a cluster of multiple processor-based devices 100 are present). In this manner, media power consumption by the VMs 112(0)-112 (V) may be efficiently and simultaneously tracked using the power telemetry counters 128(0)-128(P) to aggregate relative media power values for each of the VMs 112(0)-112(V) and/or for the VM group 114, based on multiple underlying operations.

As noted above, the relative power value 130 may vary depending on the media access request type of the media access request 116. For instance, the controller circuit 106 may consume more power when performing an encrypted read or write access than when performing an unencrypted read or write access. Accordingly, to provide relative power values for each different media access request type, the power telemetry circuit 120 in some embodiments may include a relative power CSR 134(0). The relative power CSR 134(0) comprises a plurality of relative power fields (not shown) that each corresponds to a different media access request type, and that each stores a relative power value for that media access request type. When incrementing the power telemetry counter 128(0) corresponding to the power telemetry event 122(0), the power telemetry circuit 120 identifies a relative power field in the relative power CSR 134(0) that corresponds to the media access request type of the media access request 116, and then retrieves the relative power value 130 from the relative power field.

To account for different relative power values when the controller circuit 106 is in different media utilization states, the power telemetry circuit 120 in some embodiments may provide a plurality of relative power CSRs 134(0)-134(R), each corresponding to a different media utilization state of the controller circuit 106. The power telemetry circuit 120 in such embodiments tracks a current media utilization state (captioned as "CURR MEDIA UTIL" in FIG. 1) 136 representing a current workload experienced by the controller circuit 106, and selects, e.g., the relative power CSR 134(0) from among the plurality of relative power CSRs 134(0)-134(R) based on the current media utilization state 136 of the controller circuit 106.

In some embodiments, the current media utilization state 136 may be determined by the power telemetry circuit 120 using a media access vector (captioned as "MEDIA ACC VECTOR" in FIG. 1) 138 comprising a plurality of bits 140(0)-140(B). Each of the bits 140(0)-140(B) of the media access vector 138 corresponds to a specified time interval (e.g., a specified number of execution cycles of the controller circuit 106, as a non-limiting example). Upon detecting the media access request 116, the power telemetry circuit 120 sets a bit (e.g., the bit 140(0)) corresponding to a current time interval (e.g., a most recent execution cycle of the controller circuit 106, as a non-limiting example). If the power telemetry circuit 120 does not detect any media access requests during the current time interval, the power telemetry circuit 120 clears the bit 140(0). The power telemetry circuit 120 may then subsequently determine the current media utilization state 136 of the controller circuit 106 based on a count of set bits.

The media access vector 138 in some embodiments may comprise a circular buffer including a large number of bits 140(0)-140(B), such that determining the number of set bits among the plurality of bits 140(0)-140(B) by examining the value of each of the bits 140(0)-140(B) individually is unacceptably inefficient. In such embodiments, the count of set bits among the plurality of bits 140(0)-140(B) may be tracked by the power telemetry circuit 120 using a media access counter (captioned as "MEDIA ACC COUNTER" in FIG. 1) 142. When the power telemetry circuit 120 sets or clears the bit corresponding to the current time interval, the power telemetry circuit 120 updates the media access counter 142 based on a previous value of the bit corresponding to the current time interval. For example, if the previous value of the bit is zero (0) and the power telemetry circuit 120 sets the value of the bit to one (1), the power telemetry circuit 120 increments the media access counter 142. Conversely, if the previous value of the bit is one (1) and the power telemetry circuit 120 clears the value of the bit to zero (0), the power telemetry circuit 120 decrements the media access counter 142. If the value of the bit is unchanged, the power telemetry circuit 120 does not modify the media access counter 142. The power telemetry circuit 120 may subsequently determine the count of set bits among the plurality of bits 140(0)-140(B) based on a value of the media access counter 142.

To select a relative power CSR such as the relative power CSR 134(0) from among the plurality of relative power CSRs 134(0)-134(R), the power telemetry circuit 120 in some embodiments may compare the current media utilization state 136 of the controller circuit 106 to one or more utilization threshold values. The utilization threshold values may be stored in corresponding utilization threshold fields (not shown) of a media utilization threshold CSR (captioned as "MEDIA UTIL THRESHOLD CSR" in FIG. 1) 144. Exemplary contents and use of the relative power CSRs 134(0)-134(R) and the media utilization threshold CSR 144 in selecting the relative power CSR 134(0) based on the media access request type and the current media utilization state 136 are discussed in greater detail below with respect to FIGS. 3 and 4, respectively.

Figure 2:
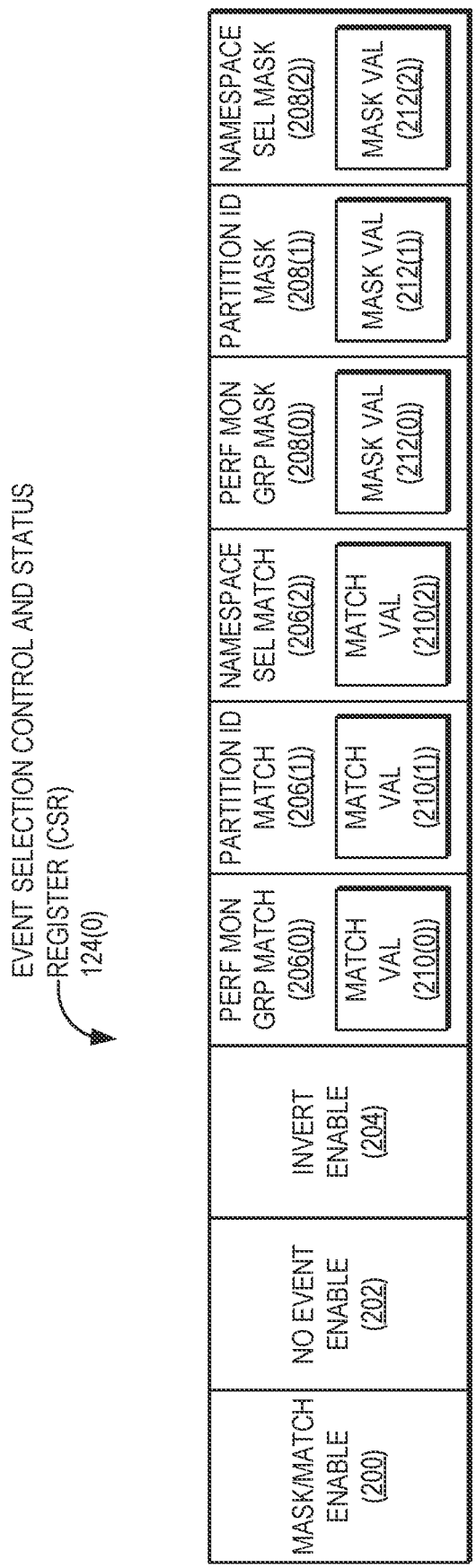
FIG. 2 is a block diagram illustrating exemplary fields and contents of the event selection control and status register (CSR) of FIG. 1, according to some embodiments.

As noted above, the power telemetry circuit 120 is configured to determine whether to increment the power telemetry counter 128(0) corresponding to the power telemetry event 122(0) by determining whether the media access request 116 matches the event selection filter 126 that is specified by the event selection CSR 124(0) that corresponds to the power telemetry event 122(0). In this regard, FIG. 2 illustrates exemplary fields of the event selection CSR 124(0) that together define the event selection filter 126 in some embodiments. It is to be understood that the event selection CSR 124(0) in other embodiments may comprise more or fewer fields than illustrated in FIG. 2, and/or may comprise different fields than those illustrated in FIG. 2. It is to be further understood that, while not illustrated in FIG. 1 or 2, the event selection CSRs 124(1)-124(P) of FIG. 1 include fields corresponding to those shown in FIG. 2 for the event selection CSR 124(0).

As seen in FIG. 2, the event selection CSR 124(0) includes a mask/match enable indicator field (captioned as "MASK/MATCH ENABLE" in FIG. 2) 200, a no event enable indicator field (captioned as "NO EVENT ENABLE" in FIG. 2) 202, and an invert enable indicator field (captioned as "INVERT ENABLE" in FIG. 2) 204. The event selection CSR 124(0) further includes a performance monitoring group match field (captioned as "PERF MON GRP MATCH" in FIG. 2) 206(0), a partition identifier (ID) match field (captioned as "PARTITION ID MATCH" in FIG. 2) 206(1), and a namespace selector match field (captioned as "NAMESPACE SEL MATCH" in FIG. 2) 206(2), collectively referred to herein as "request match fields 206." In addition, the event selection CSR 124(0) includes a performance monitoring group mask field (captioned as "PERF MON GRP MASK" in FIG. 2) 208(0), a partition identifier mask field (captioned as "PARTITION ID MASK" in FIG. 2) 208(1), and a namespace selector mask field (captioned as "NAMESPACE SEL MASK" in FIG. 2) 208(2), collectively referred to herein as "request mask fields 208." The purpose and functionality of each illustrated field is described below in Table 1:

TABLE 1

| CSR Fields | Description |
| --- | --- |
| Mask/match enable indicator field 200 | Enables event selection based on the corresponding mask and match fields. When set to a value of one (1) (and the invert enable indicator field 204 is set to a value of zero(0)), a media access request matches when its performance monitoring group identifier, its partition identifier, and its partition namespace selector identifier, ANDed with the values of the respective mask fields below, match the values of the corresponding match fields below. When the mask/match enable indicator field 200 is set to a value of one (1), the no event enable indicator field 202 must be set to a value of zero (0). |
| No event enable indicator field 202 | When set to a value of one (1), a media access request matches when no event selection occurs for any event selection with the mask/match enable indicator field 200 set to a value of one (1). When the no event enable indicator field 202 is set to a value of one (1), the mask/match enable indicator field 200 must be set to a value of zero (0). |
| Invert enable indicator field 204 | When set to a value of one (1), this event selection's output is inverted. |
| Performance monitoring group match field 206(0) | Stores MPAM performance monitoring group match value (captioned as "MATCH VAL" in FIG. 2) 210(0). |
| Partition identifier match field 206(1) | Stores MPAM partition identifier match value (captioned as "MATCH VAL" in FIG. 2) 210(1). |
| Namespace selector match field 206(2) | Stores MPAM partition identifier namespace selector match value (captioned as "MATCH VAL" in FIG. 2) 210(2). |
| Performance monitoring group mask field 208(0) | Stores MPAM performance monitoring group mask value (captioned as "MASK VAL" in FIG. 2) 212(0). |
| Partition identifier mask field 208(1) | Stores MPAM partition identifier mask value (captioned as "MASK VAL" in FIG. 2) 212(1). |
| Namespace selector mask field 208(2) | Stores MPAM partition identifier namespace selector mask value (captioned as "MASK VAL" in FIG. 2) 212(2). |

The values stored in the request match fields 206 and the request mask fields 208 are collectively referred to herein as "request match values 210" and "request mask values 212," respectively.

The mask/match enable indicator field 200 of the event selection CSR 124(0) enables the power telemetry circuit 120 of FIG. 1 to use a mask-and-match comparison technique, rather than an explicit match technique, to determine whether to measure the power consumed by a media access request such as the media access request 116 of FIG. 1. This allows the power telemetry circuit 120 to select a group of VMs for which a portion of the corresponding partition identifiers are the same, and/or where a groups of VMs share the same performance monitoring group value.

In this regard, as noted above, when the mask/match enable indicator field 200 is set to a value of one (1) and the invert enable indicator field 204 is set to a value of zero (0), the power telemetry circuit 120 will measure the power consumed by the media access request 116 when its MPAM performance monitoring group identifier, its MPAM partition identifier and its MPAM partition namespace selector identifier, ANDed with the values of the performance monitoring group mask value 212(0), the partition ID mask value 212(1), and the namespace selector mask value 212(2), respectively, match the values of the performance monitoring group match value 210(0), the partition ID match value 210(1), and the namespace selector match value 210(2), respectively. Conversely, when the mask/match enable indicator field 200 and the invert enable indicator field 204 are both set to a value of one (1), the power telemetry circuit 120 will measure the power consumed by the media access request 116 when the cumulative result of the match operations above is false. In this manner, the invert enable indicator field 204 enables the power telemetry circuit 120 to measure the power of all media access requests other than those of the power telemetry events 122(0)-122(P) corresponding to the event selection CSRs 124(0)-124(P).

The no event enable indicator field 202 of the event selection CSR 124(0) provides additional flexibility for the power telemetry circuit 120 when determining whether to measure the power consumed by the media access request 116. If the no event enable indicator field 202 is set to a value of one (1) and the invert enable indicator field 204 is set to a value of zero (0), the power telemetry circuit 120 will measure the power consumed by the media access request 116 only if the media access request 116 does not match any of the power telemetry events 122(0)-122(P) for which the mask/match enable indicator field 200 of the corresponding event selection CSR 124(0) is set to a value of one (1). In this manner, the power telemetry circuit 120 can measure the power for all media access requests except those corresponding to and being measured by other power telemetry events 122(0)-122(P). If the no event enable indicator field 202 and the invert enable indicator field 204 are both set to a value of one (1), the media access requests that match will be the aggregate of those selected by all of the power telemetry events 122(0)-122(P) for which the mask/match enable indicator field 200 of the corresponding event selection CSR 124(0) is set to a value of one (1).

Figure 3:
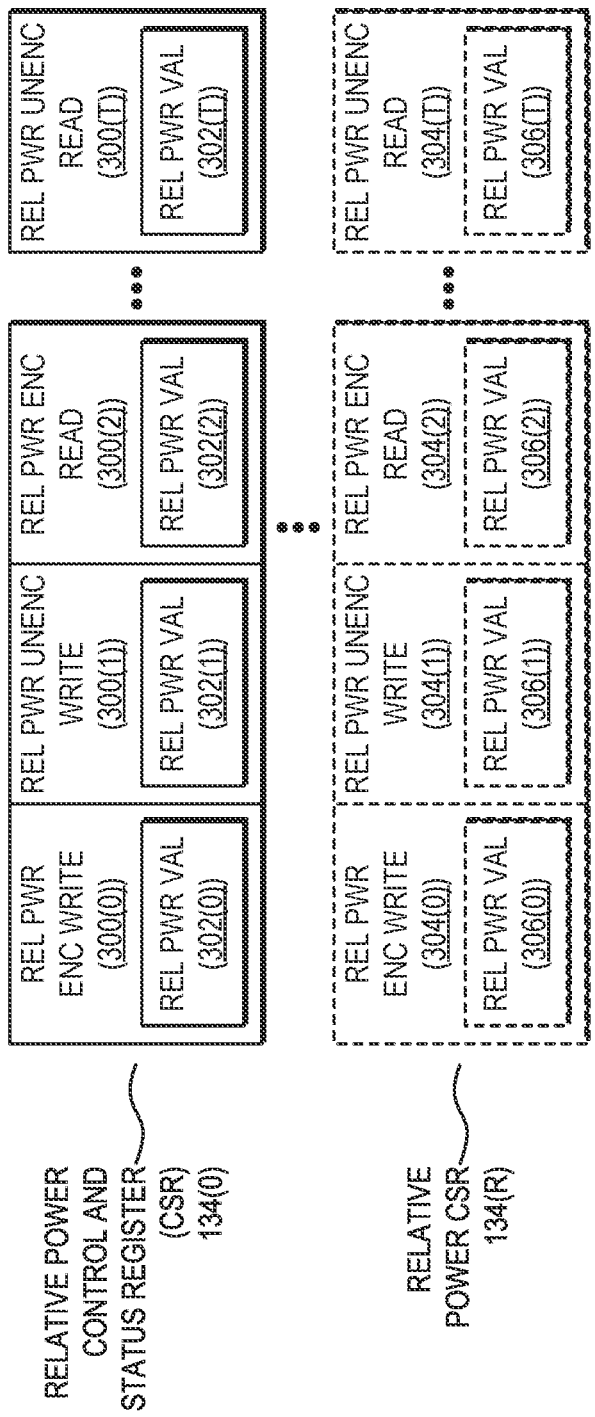
FIG. 3 is a block diagram illustrating exemplary fields and contents of the relative power CSRs of FIG. 1, according to some embodiments.

FIG. 3 illustrates exemplary fields of the relative power CSRs 134(0)-134(R) of FIG. 1 in which different relative power values may be associated with different media access request types, according to some embodiments. As seen in FIG. 3, each of the relative power CSRs 134(0)-134(R) includes fields that correspond to the different media access request types. Thus, in this example, the relative power CSR 134(0) comprises a relative power encrypted write field (captioned as "REL PWR ENC WRITE" in FIG. 3) 300(0) that stores a relative power value (captioned as "REL PWR VAL" in FIG. 3) 302(0) representing power consumed by an encrypted write operation, and a relative power unencrypted write field (captioned as "REL PWR UNENC WRITE" in FIG. 3) 300(1) that stores a relative power value (captioned as "REL PWR VAL" in FIG. 3) 302(1) representing power consumed by an unencrypted write operation. Similarly, the relative power CSR 134(0) further comprises a relative power encrypted read field (captioned as "REL PWR ENC READ" in FIG. 3) 300(2) that stores a relative power value (captioned as "REL PWR VAL" in FIG. 3) 302(2) representing power consumed by an encrypted read operation, and a relative power unencrypted read field (captioned as "REL PWR UNENC READ" in FIG. 3) 300(T) that stores a relative power value (captioned as "REL PWR VAL" in FIG. 3) 302(T) representing power consumed by an unencrypted read operation.

As noted above, the relative power consumed by each media access request type may vary according to a current media utilization state of the controller circuit 106 of FIG. 1. For instance, the power required for the controller circuit 106 to perform an encrypted read media access during a state of higher media utilization (i.e., when the controller circuit is operating under a higher workload) may differ from the power required to perform the encrypted read media access during a state of lower media utilization. Accordingly, some embodiments may provide that each relative power CSR of the plurality of relative power CSRs 134(0)-134(R) corresponds to a different media utilization state. In such embodiments, for example, the relative power CSR 134(0) may correspond to a lower media utilization state, and the relative power encrypted write field 300(0), the relative power unencrypted write field 300(1), the relative power encrypted read field 300(2), and the relative power unencrypted read field 300(T) may store relative power values 302(0)-302(T), respectively, that represent media power consumption for each media access request type at the lower media utilization state. The relative power CSR 134(R), in turn, may correspond to a higher media utilization state. In the example of FIG. 3, the relative power CSR 134(R) comprises a relative power encrypted write field (captioned as "REL PWR ENC WRITE" in FIG. 3) 304(0), a relative power unencrypted write field (captioned as "REL PWR UNENC WRITE" in FIG. 3) 304(1), a relative power encrypted read field (captioned as "REL PWR ENC READ" in FIG. 3) 304(2), and a relative power unencrypted read field (captioned as "REL PWR UNENC READ" in FIG. 3) 304(T) that store relative power values (each captioned as "REL PWR VAL" in FIG. 3) 306(0)-306(T), respectively, that represent media power consumption for each media access request type at the higher media utilization state.

It is to be understood that, while FIG. 3 shows only two (2) relative power CSRs 134(0) and 134(R) corresponding to two media utilization states, some embodiments may include more relative power CSRs corresponding to more media utilization states. Additionally, it is to be further understood that the relative power CSRs 134(0)-134(R) may include more or fewer fields, corresponding to more or fewer media access request types, than those shown in FIG. 3.

As discussed above with respect to FIG. 1, the current media utilization state 136 of the controller circuit 106 may be tracked by the power telemetry circuit 120 in some embodiments using, e.g., the media access vector 138 or the media access counter 142. The current media utilization state 136 may then be used by the power telemetry circuit 120 to determine an index between zero (0) and the maximum index R of the relative power CSRs 134(0)-134(R), and use the index to select a corresponding one of the relative power CSRs 134(0)-134(R) from which to retrieve a relative power value for the media access request 116. For example, the power telemetry circuit 120 may compare the current media utilization state 136 to one or more utilization threshold values stored in the media utilization threshold CSR 144.

Figure 4:
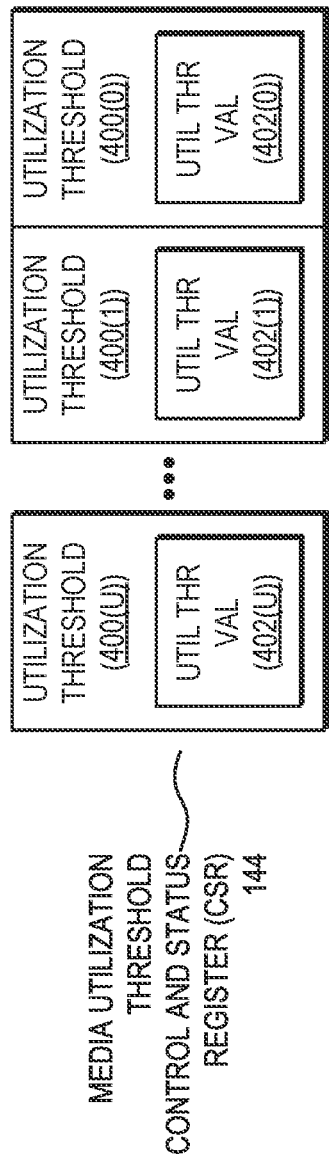
FIG. 4 is a block diagram illustrating exemplary fields and contents of the media utilization threshold CSR of FIG. 1, according to some embodiments.

In this regard, FIG. 4 illustrates exemplary fields that may be provided by the media utilization threshold CSR 144 to store utilization threshold values, according to some embodiments. As seen in FIG. 4, the media utilization threshold CSR 144 comprises a plurality of utilization threshold fields (captioned as "UTILIZATION THRESHOLD" in FIG. 4) 400(0)-400(U) that store corresponding utilization threshold values (captioned as "UTIL THR VAL" in FIG. 4) 402(0)-402(U). The utilization threshold values 402(0)-402(U) in FIG. 4 are stored in order of increasing value, with the utilization threshold field 400(0) storing the lowest utilization threshold value 402(0) in the rightmost bits of the media utilization threshold CSR 144 and the utilization threshold field 400(U) storing the highest utilization threshold value 402(U) in the leftmost bits of the media utilization threshold CSR 144.

To determine an index to select one of the relative power CSRs 134(0)-134(R) from which to retrieve a relative power value for the media access request 116, the current media utilization state 136 may be compared to one or more of the utilizations threshold values 402(0)-402(U). For instance, the power telemetry circuit 120 may determine the index to be zero (0) if the current media utilization state 136 is greater than or equal to zero (0) and less than the lowest utilization threshold value 402(0), may determine the index to be one (1) if the current media utilization state 136 is greater than or equal to the utilization threshold value 402(0) and less than the utilization threshold value 402(1), and so on in like fashion.

Figure 5A:
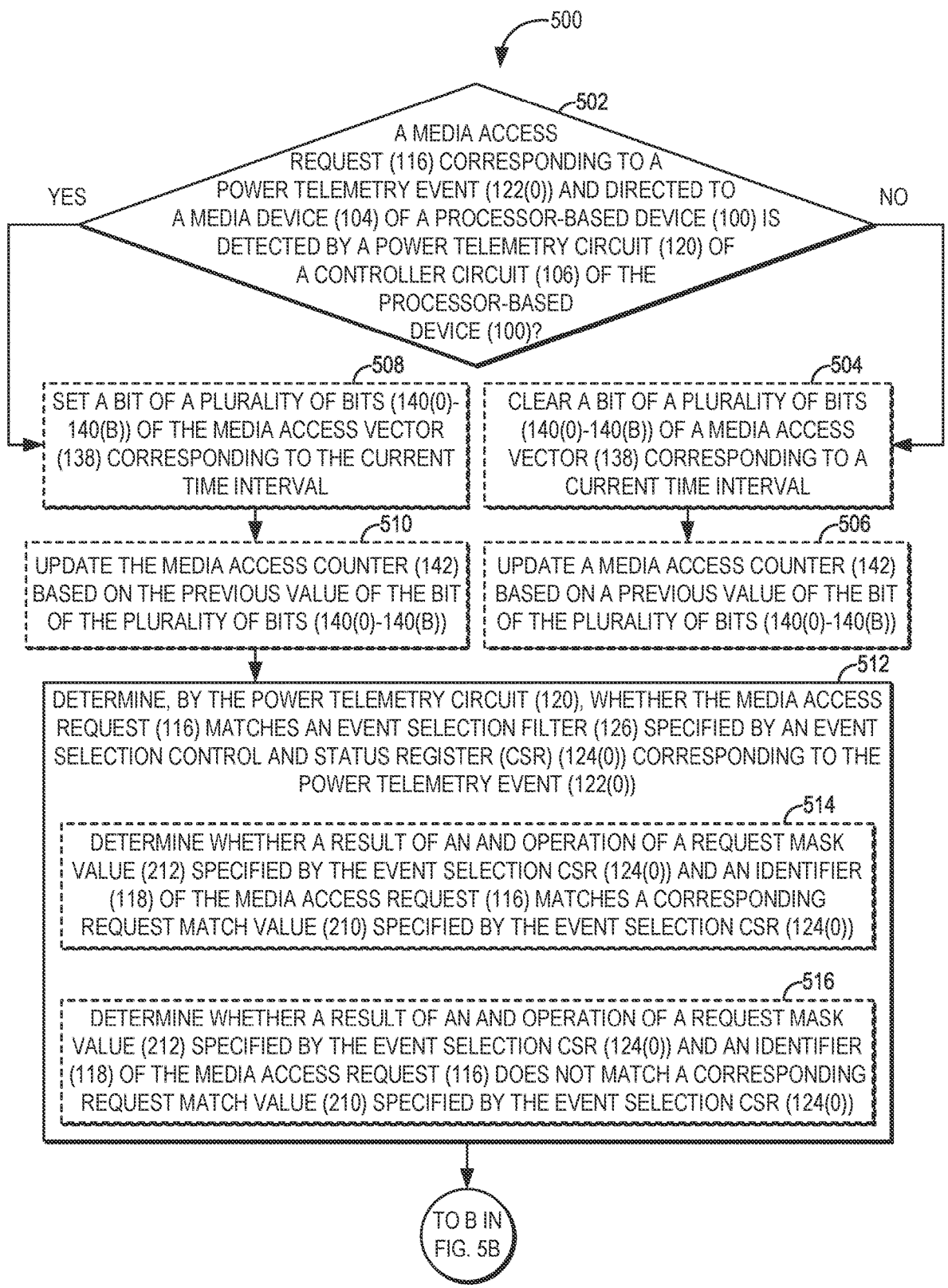
FIGS. 5A-5C are flowcharts illustrating exemplary operations for providing media power telemetry for VMs, according to some embodiments.
Figure 5B:
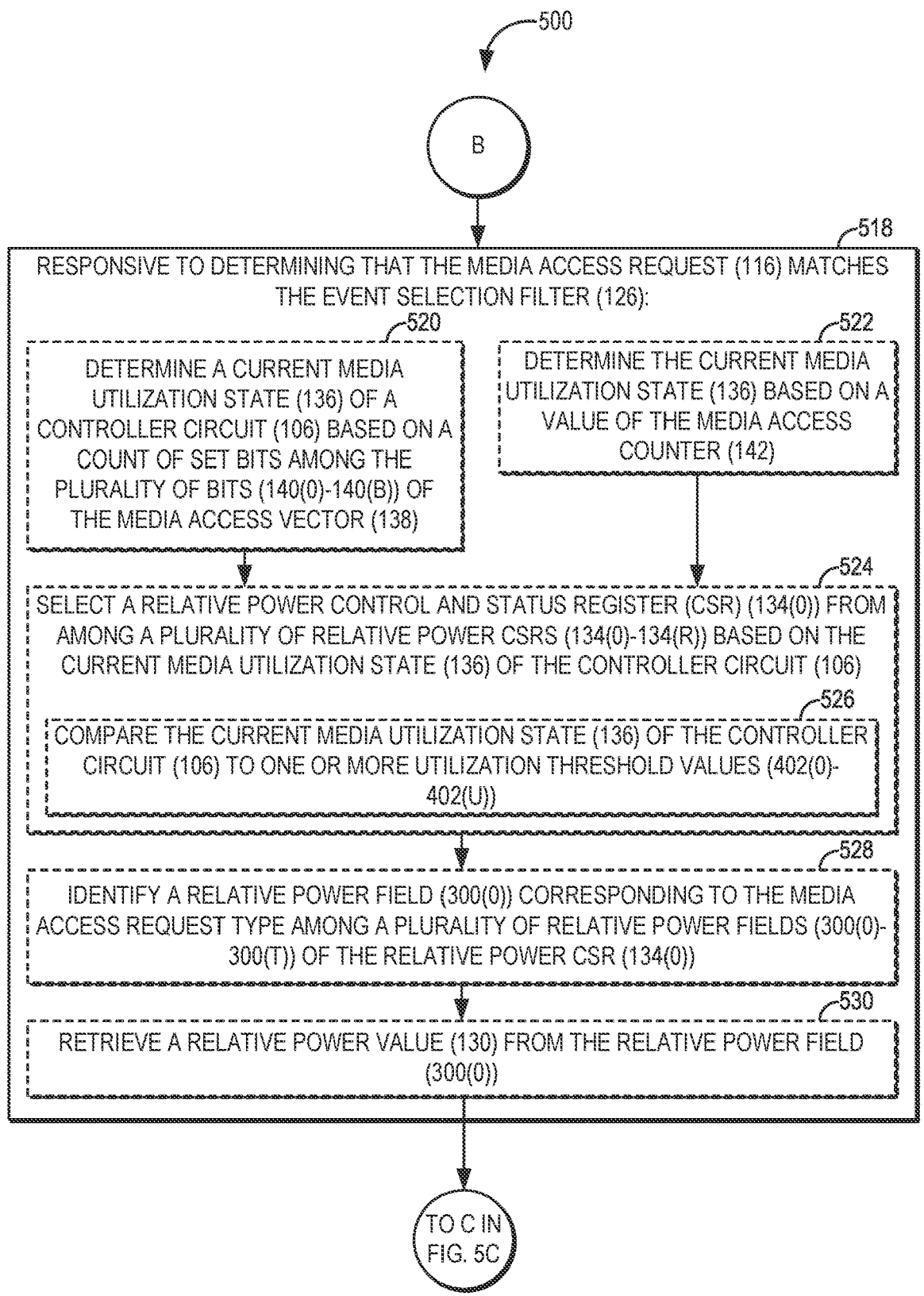
Figure 5C:
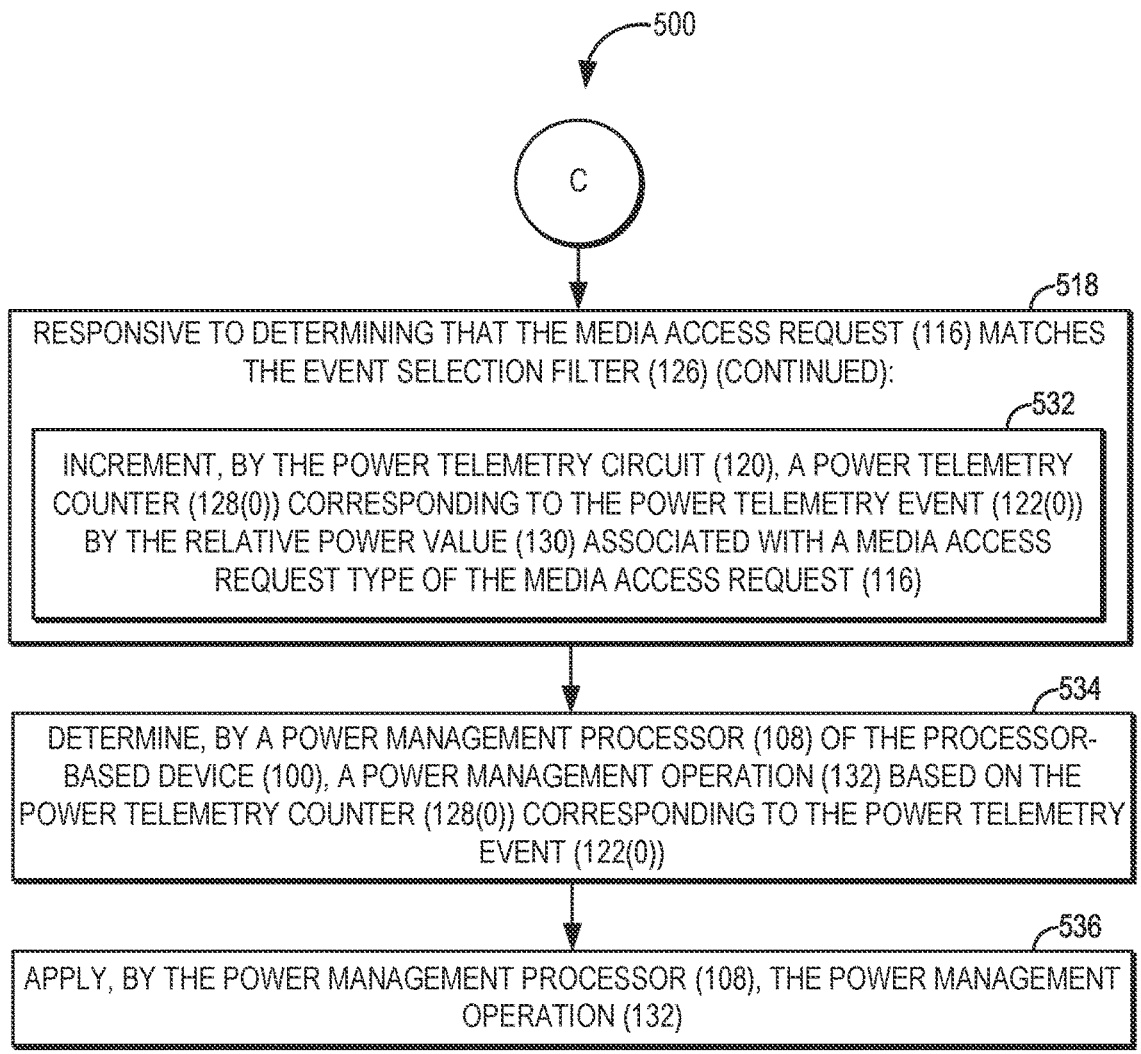

FIGS. 5A-5C provide a flowchart illustrating exemplary operations 500 for providing and using media power telemetry for VMs by the power telemetry circuit 120 and the power management processor 108 of FIG. 1. For the sake of clarity, elements of FIGS. 1-4 are referenced in describing FIGS. 5A-5C. It is to be understood that some operations illustrated in FIGS. 5A-5C may occur in an order other than that illustrated in FIGS. 5A-5C in some embodiments, and/or may be omitted in some embodiments.

The exemplary operations 500 begin in FIG. 5A with a power telemetry circuit of a controller circuit of a processor-based device (e.g., the power telemetry circuit 120 of the controller circuit 106 of the processor-based device 100 of FIG. 1) determining whether a media access request (such as the media access request 116 of FIG. 1) corresponding to a power telemetry event (e.g., the power telemetry event 122(0) of FIG. 1) and directed to a media device (such as the media device 104 of FIG. 1) of the processor-based device 100 is detected (block 502). In some embodiments, if a media access request is not detected, the power telemetry circuit 120 may clear a bit of a plurality of bits of a media access vector (e.g., the bits 140(0)-140(B) of the media access vector 138 of FIG. 1) corresponding to a current time interval (block 504). Some such embodiments may further provide that the power telemetry circuit 120 updates a media access counter (such as the media access counter 142 of FIG. 1) based on a previous value of the bit of the plurality of bits 140(0)-140(B) (e.g., by decrementing the media access counter 142) (block 506).

According to some embodiments, if the media access request 116 is detected, the power telemetry circuit 120 may set a bit of the plurality of bits 140(0)-140(B) of the media access vector 138 corresponding to the current time interval (block 508). In some such embodiments, the power telemetry circuit 120 also updates the media access counter 142 based on the previous value of the bit of the plurality of bits 140(0)-140(B) (e.g., by incrementing the media access counter 142) (block 510).

In response to detecting the media access request 116, the power telemetry circuit 120 determines whether the media access request 116 matches an event selection filter (e.g., the event selection filter 126 of FIG. 1) specified by an event selection CSR (such as the event selection CSR 124(0) of FIG. 1) corresponding to the power telemetry event 122(0) (block 512). According to some embodiments, the operations of block 512 for determining whether the media access request 116 matches the event selection filter 126 may comprise the power telemetry circuit 120 determining whether a result of an AND operation of a request mask value (such as the request mask value 212 of FIG. 2) specified by the event selection CSR 124(0) and an identifier (e.g., the identifier 118 of FIG. 1) of the media access request 116 matches a corresponding request match value (such as the request match value 210 of FIG. 2) specified by the event selection CSR 124(0) (block 514). In some embodiments, the operations of block 512 for determining whether the media access request 116 matches the event selection filter 126 may comprise the power telemetry circuit 120 determining whether a result of an AND operation of the request mask value 212 specified by the event selection CSR 124(0) and the identifier 118 of the media access request 116 does not match the corresponding request match value 210 specified by the event selection CSR 124(0) (block 516). The exemplary operations 500 then continue at block 518 of FIG. 5B.

Turning now to FIG. 5B, in response to determining that the media access request 116 matches the event selection filter 126, the power telemetry circuit 120 performs a series of operations (block 518). Some embodiments may provide that the power telemetry circuit 120 may determine a current media utilization state (e.g., the current media utilization state 136 of FIG. 1) of a controller circuit 106 based on a count of set bits among the plurality of bits 140(0)-140(B) of the media access vector 138 (block 520). According to some embodiments, the power telemetry circuit 120 may determine the current media utilization state 136 based on a value of the media access counter 142 (block 522).

The power telemetry circuit 120 next may select a relative power CSR from among a plurality of relative power CSRs (such as the relative power CSR 134(0) of the plurality of relative power CSRs 134(0)-134(R) of FIG. 1) based on the current media utilization state 136 of the controller circuit 106 (block 524). In some embodiments, the operations of block 524 for selecting the relative power CSR 134(0) may comprise the power telemetry circuit 120 comparing the current media utilization state 136 of the controller circuit 106 to one or more utilization threshold values (e.g., the utilization threshold values 402(0)-402(U) of FIG. 4) (block 526). The power telemetry circuit 120 then identifies a relative power field corresponding to the media access request type among a plurality of relative power fields (such as the relative power field 300(0) of the plurality of relative power fields 300(0)-300(T) of FIG. 3) of the relative power CSR 134(0) (block 528). The power telemetry circuit 120 retrieves a relative power value (e.g., the relative power value 130 of FIG. 1) from the relative power field 300(0) (block 530). The exemplary operations 500 then continue at block 532 of FIG. 5C.

Referring now to FIG. 5C, the operations performed by the power telemetry circuit 120 in response to determining that the media access request 116 matches the event selection filter 126 continue (block 518). The power telemetry circuit 120 increments a power telemetry counter (such as the power telemetry counter 128(0) of FIG. 1) corresponding to the power telemetry event 122(0) by the relative power value 130 associated with a media access request type of the media access request 116 (block 532). Subsequently, a power management processor (e.g., the power management processor 108 of FIG. 1) of the processor-based device 100 determines a power management operation (such as the power management operation 132 of FIG. 1) based on the power telemetry counter 128(0) corresponding to the power telemetry event 122(0) (block 534). The power management processor 108 then applies the power management operation 132 (block 536).

Figure 6:
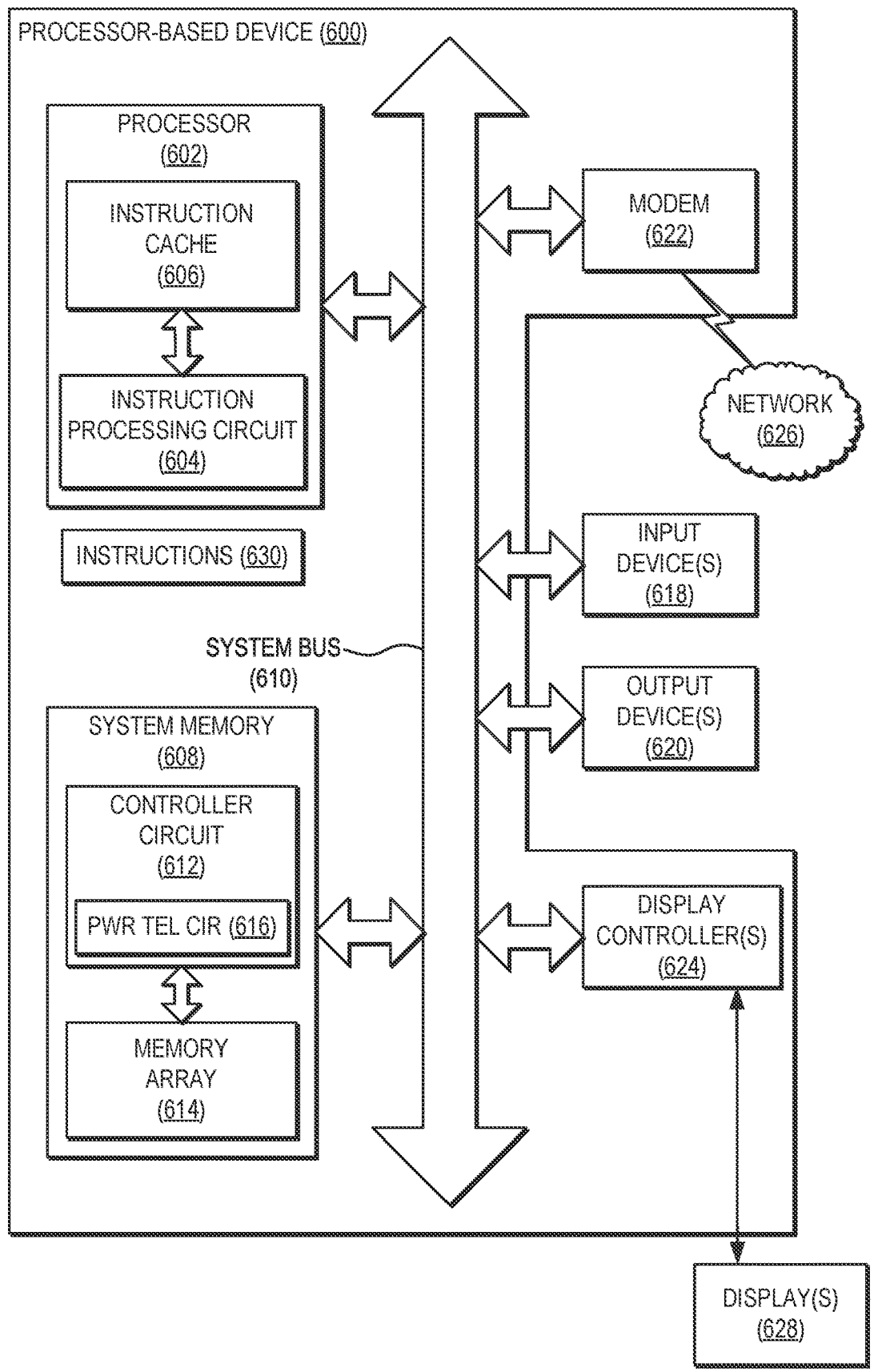
FIG. 6 is a block diagram of an exemplary processor-based device, such as the processor-based device of FIG. 1, that is configured to provide media power telemetry for VMs.

FIG. 6 is a block diagram of an exemplary processor-based device 600 that includes a processor 602 (e.g., a microprocessor) that includes an instruction processing circuit 604. The processor-based device 600 can be the processor-based device 100 in FIG. 1 as an example. The processor-based device 600 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer.

In this example, the processor 602 represents one or more general-purpose processing circuits, such as a microprocessor, central processing unit, or the like. The processor 602 is configured to execute processing logic in instructions for performing the operations and steps discussed herein. In this example, the processor 602 includes an instruction cache 606 for temporary, fast access memory storage of instructions accessible by the instruction processing circuit 604. Fetched or prefetched instructions from a memory, such as from the system memory 608 over a system bus 610, are stored in the instruction cache 606. The instruction processing circuit 604 is configured to process instructions fetched into the instruction cache 606 and process the instructions for execution.

The processor 602 and the system memory 608 are coupled to the system bus 610 and can intercouple peripheral devices included in the processor-based device 600. As is well known, the processor 602 communicates with these other devices by exchanging address, control, and data information over the system bus 610. For example, the processor 602 can communicate bus transaction requests to a controller circuit 612 in the system memory 608 as an example of a subordinate device. Although not illustrated in FIG. 6, multiple system buses 610 could be provided, wherein each system bus constitutes a different fabric. In this example, the controller circuit 612 is configured to provide memory access requests to a memory array 614 in the system memory 608, and comprises a power telemetry circuit (captioned "PWR TEL CIR" in FIG. 6) 616 that corresponds in functionality to the power telemetry circuit 120 of FIG. 1. The memory array 614 is comprised of an array of storage bit cells for storing data. The system memory 608 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 610. As illustrated in FIG. 6, these devices can include the system memory 608, one or more input device(s) 618, one or more output device(s) 620, a modem 622, and one or more display controllers 624, as examples. The input device(s) 618 can include any type of input device, including but not limited to input keys, switches, voice processors, etc. The output device(s) 620 can include any type of output device, including but not limited to audio, video, other visual indicators, etc. The modem 622 can be any device configured to allow exchange of data to and from a network 626. The network 626 can be any type of network, including but not limited to a wired or wireless network, a private or public network, a local area network (LAN), a wireless local area network (WLAN), a wide area network (WAN), a BLUETOOTH™ network, and the Internet. The modem 622 can be configured to support any type of communications protocol desired. The processor 602 may also be configured to access the display controller(s) 624 over the system bus 610 to control information sent to one or more displays 628. The display(s) 628 can include any type of display, including but not limited to a cathode ray tube (CRT), a liquid crystal display (LCD), a plasma display, etc.

The processor-based device 600 in FIG. 6 may include a set of instructions 630 to be executed by the processor 602 for any application desired according to the instructions. The instructions 630 may be stored in the system memory 608, processor 602, and/or instruction cache 606 as examples of a non-transitory computer-readable medium. The instructions 630 may also reside, completely or at least partially, within the system memory 608 and/or within the processor 602 during their execution. The instructions 630 may further be transmitted or received over the network 626 via the modem 622.

While the computer-readable medium is described herein in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software process.

The embodiments disclosed herein may be provided as a computer program product, or software process, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the processor-based devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device, comprising:
 a controller circuit comprising a power telemetry circuit; and
 a power management processor;
 the power telemetry circuit configured to:
  determine whether a media access request corresponding to a power telemetry event and directed to a media device is detected;
  responsive to determining that the media access request corresponding to the power telemetry event and directed to the media device is detected, determine whether the media access request matches an event selection filter specified by an event selection control and status register (CSR) corresponding to the power telemetry event; and
  responsive to determining that the media access request matches the event selection filter, increment a power telemetry counter corresponding to the power telemetry event by a relative power value associated with a media access request type of the media access request; and the power management processor configured to:
  determine a power management operation based on the power telemetry counter corresponding to the power telemetry event; and
  apply the power management operation.

2. The processor-based device of claim 1, wherein the power telemetry event comprises one of an event indicating that the media access request is received from a virtual machine (VM) and an event indicating that the media access request is received from a VM group comprising a plurality of VMs.

3. The processor-based device of claim 1, wherein the power telemetry circuit is configured to determine whether the media access request matches the event selection filter by being configured to determine whether a result of an AND operation of a request mask value specified by the event selection CSR and an identifier of the media access request matches a corresponding request match value specified by the event selection CSR.

4. The processor-based device of claim 1, wherein the power telemetry circuit is configured to determine whether the media access request matches the event selection filter by being configured to determine whether a result of an AND operation of a request mask value specified by the event selection CSR and an identifier of the media access request does not match a corresponding request match value specified by the event selection CSR.

5. The processor-based device of claim 1, wherein the power telemetry circuit is further configured to, further responsive to determining that the media access request matches the event selection filter:
  identify a relative power field corresponding to the media access request type among a plurality of relative power fields of a relative power CSR; and
  retrieve the relative power value from the relative power field.

6. The processor-based device of claim 5, wherein:
  the relative power CSR is one of a plurality of relative power CSRs, each corresponding to a media utilization state of the controller circuit; and
  the power telemetry circuit is further configured to select the relative power CSR from among the plurality of relative power CSRs based on a current media utilization state of the controller circuit.

7. The processor-based device of claim 6, wherein:
  the processor-based device further comprises a media access vector comprising a plurality of bits each corresponding to a specified time interval;
  the power telemetry circuit is configured to determine whether the media access request corresponding to the power telemetry event and directed to the media device is detected by being configured to determine whether the media access request is detected within a current time interval; and
  the power telemetry circuit is further configured to:
    responsive to determining that the media access request is detected within the current time interval, set a bit of the plurality of bits of the media access vector corresponding to the current time interval;
    responsive to determining that no media access request is detected within the current time interval, clear the bit of the plurality of bits of the media access vector corresponding to the current time interval; and
    determine the current media utilization state based on a count of set bits among the plurality of bits of the media access vector.

8. The processor-based device of claim 6, wherein:
  the processor-based device further comprises a media access counter;
  the power telemetry circuit is further configured to update the media access counter based on a previous value of the bit of the plurality of bits of the media access vector corresponding to the current time interval; and
  the power telemetry circuit is configured to determine the current media utilization state based on a count of set bits among the plurality of bits of the media access vector by being configured to determine the count of set bits based on a value of the media access counter.

9. The processor-based device of claim 6, wherein the power telemetry circuit is configured to select the relative power CSR from among the plurality of relative power CSRs based on the current media utilization state of the controller circuit by being configured to compare the current media utilization state of the controller circuit to one or more utilization threshold values.

10. The processor-based device of claim 9, wherein each utilization threshold value of the one or more utilization threshold values corresponds to a utilization threshold field of a plurality of utilization threshold fields of a media utilization threshold CSR.

11. A method, comprising:
  determining, by a power telemetry circuit of a controller circuit of a processor-based device, that a media access request corresponding to a power telemetry event and directed to a media device of the processor-based device is detected;
  responsive to determining that the media access request corresponding to the power telemetry event and directed to the media device of the processor-based device is detected, determining, by the power telemetry circuit, that the media access request matches an event selection filter specified by an event selection control and status register (CSR) corresponding to the power telemetry event;
  responsive to determining that the media access request matches the event selection filter, incrementing, by the power telemetry circuit, a power telemetry counter corresponding to the power telemetry event by a relative power value associated with a media access request type of the media access request;
  determining, by a power management processor of the processor-based device, a power management operation based on the power telemetry counter corresponding to the power telemetry event; and
  applying, by the power management processor, the power management operation.

12. The method of claim 11, wherein determining that the media access request matches the event selection filter comprises determining that a result of an AND operation of a request mask value specified by the event selection CSR and an identifier of the media access request matches a corresponding request match value specified by the event selection CSR.

13. The method of claim 11, wherein determining that the media access request matches the event selection filter comprises determining that a result of an AND operation of a request mask value specified by the event selection CSR and an identifier of the media access request does not match a corresponding request match value specified by the event selection CSR.

14. The method of claim 11, further comprising, further responsive to determining that the media access request matches the event selection filter:
   identifying a relative power field corresponding to the media access request type among a plurality of relative power fields of a relative power CSR; and
   retrieving the relative power value from the relative power field.

15. The method of claim 14, wherein:
   the relative power CSR is one of a plurality of relative power CSRs, each corresponding to a media utilization state of the controller circuit; and
   the method further comprises selecting the relative power CSR from among the plurality of relative power CSRs based on a current media utilization state of the controller circuit.

16. The method of claim 15, wherein:
   the processor-based device further comprises a media access vector comprising a plurality of bits;
   determining that the media access request corresponding to the power telemetry event and directed to the media device of the processor-based device is detected comprises determining that the media access request is detected within a current time interval; and
   the method further comprises:
      responsive to determining that the media access request is detected within the current time interval, setting a bit of the plurality of bits of the media access vector corresponding to the current time interval; and
      determining the current media utilization state based on a count of set bits among the plurality of bits of the media access vector.

17. The method of claim 15, wherein:
   the processor-based device further comprises a media access counter; and
   the method further comprises updating the media access counter based on a previous value of the bit of the plurality of bits of the media access vector corresponding to the current time interval;
   wherein determining the current media utilization state based on a count of set bits among the plurality of bits of the media access vector comprises determining the count of set bits based on a value of the media access counter.

18. The method of claim 15, wherein selecting the relative power CSR from among the plurality of relative power CSRs based on the current media utilization state of the controller circuit comprises comparing the current media utilization state of the controller circuit to one or more utilization threshold values.

19. The method of claim 18, wherein each utilization threshold value of the one or more utilization threshold values corresponds to a utilization threshold field of a plurality of utilization threshold fields of a media utilization threshold CSR.

20. A non-transitory computer-readable medium, having stored thereon computer-executable instructions that, when executed by a processor device of a processor-based device, cause the processor device to:
   determine whether a media access request corresponding to a power telemetry event and directed to a media device of the processor-based device is detected;
   responsive to determining that the media access request corresponding to the power telemetry event and directed to the media device is detected, determine whether the media access request matches an event selection filter specified by an event selection control and status register (CSR) corresponding to the power telemetry event;
   responsive to determining that the media access request matches the event selection filter, increment a power telemetry counter corresponding to the power telemetry event by a relative power value associated with a media access request type of the media access request;
   determine a power management operation based on the power telemetry counter corresponding to the power telemetry event; and
   apply the power management operation.

* * * * *